United States Patent [19]

Hashimoto et al.

[11] Patent Number: 4,769,852
[45] Date of Patent: Sep. 6, 1988

[54] IMAGE PROCESSING SYSTEM

[75] Inventors: Norio Hashimoto, Tokyo; Motofumi Konishi, Yokohama; Yoshio Ando, Chigasaki; Toshio Iwaya, Shiki; Kanou Tanaka; Masahide Kotera, both of Yokohama; Yasutoshi Sugita, Urayasu; Yoshitaka Sano, Matsudo; Satoshi Ono, Yokohama, all of Japan

[73] Assignee: Canon Kabushiki Kaisha, Tokyo, Japan

[21] Appl. No.: 5,287

[22] Filed: Jan. 16, 1987

Related U.S. Application Data

[63] Continuation of Ser. No. 660,329, Oct. 12, 1984, abandoned.

[30] Foreign Application Priority Data

Oct. 17, 1983 [JP] Japan ................. 58-193861

[51] Int. Cl.⁴ .................. G06K 9/00; G09G 1/00
[52] U.S. Cl. .................... 382/45; 340/724; 340/731; 358/287; 382/47; 382/48
[58] Field of Search ................. 340/724, 730; 382/47, 382/44, 45, 48; 358/101, 107

[56] References Cited

U.S. PATENT DOCUMENTS

| | | | |
|---|---|---|---|
| 4,241,340 | 12/1980 | Raney, Jr. ................. | 340/731 |
| 4,246,578 | 1/1981 | Kawasaki et al. ........... | 340/724 |
| 4,319,272 | 3/1982 | Henry ..................... | 358/101 |
| 4,470,074 | 9/1984 | Yamada .................... | 358/287 |
| 4,528,693 | 7/1985 | Pearson et al. ............ | 382/47 |
| 4,559,533 | 12/1985 | Bass et al. ............... | 340/724 |

Primary Examiner—Leo H. Boudreau
Attorney, Agent, or Firm—Fitzpatrick, Cella, Harper & Scinto

[57] ABSTRACT

An image processing system has an original reader or an image file for generating an image signal, a soft display, a high-speed printer, a small printer, a work station with a CPU, and a switching device. An image can always be displayed or printed at the center of a display surface or of a recording medium irrespective of a difference in the image and the display surface or recording medium.

24 Claims, 9 Drawing Sheets

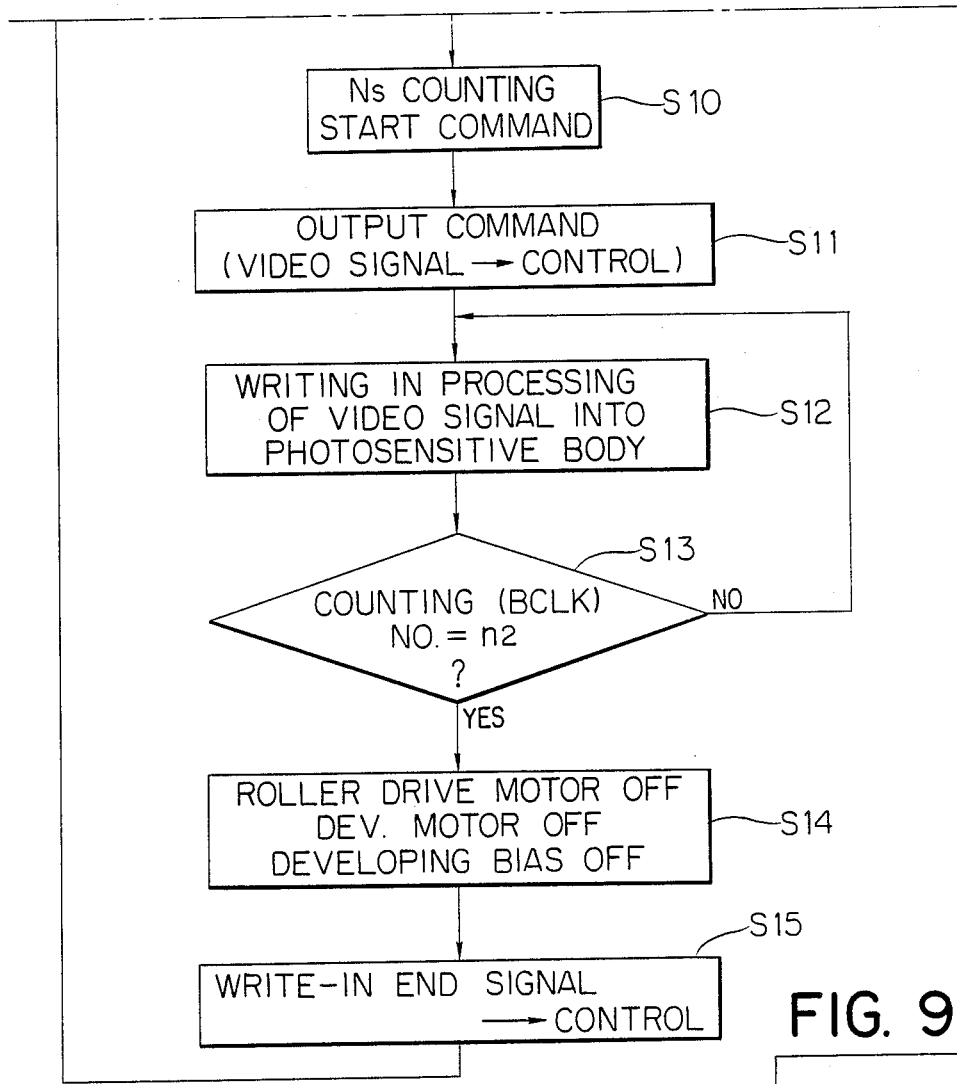

IMAGE PROCESSING SYSTEM

This application is a continuation of application Ser. No. 660,329 filed Oct. 12, 1984, now abandoned.

BACKGROUND OF THE INVENTION

1. Field of the Invention

The present invention relates to an image processing system for electrically processing image information.

2. Description of the Prior Art

An image is frequently read by photoelectrical conversion and the read image is displayed or recorded. In such a case, the following problems are presented when the size of an original image is different from that of an image display surface or of an image forming region of a recording medium. For example, assume that a display image of vertical A4 size is inputted for a display surface of vertical A3 size. When an image of vertical A4 size is displayed on an image display means of vertical A3 size, the image of vertical A4 size is displayed at an upper left corner of the display surface. When the display surface and display image have different sizes, the display position is deviated from the central portion of the display surface or image forming region, and the image observation becomes difficult. Furthermore, in a printer, the image is printed at a position deviated from a normal printing position on a recording medium such as a paper sheet, thus resulting in a poor image.

SUMMARY OF THE INVENTION

The present invention has been made in consideration of this and has as its object to provide an image processing apparatus which is capable of excellent image display in image processing.

It is another object of the present invention to provide an image processing system which can provide an image display which can be easily observed by an operator even if the size of the original image is different from that of a display surface.

It is still another object of the present invention to provide an image processing system which is capable of high-resolution display of an original image.

The above and other objects, features and effects of the present invention will become apparent from the following description when taken in conjunction with the accompanying drawings.

DETAILED DESCRIPTION OF THE PREFERRED EMBODIMENTS

The present invention will be described in detail with reference to the accompanying drawings.

Figure 1:
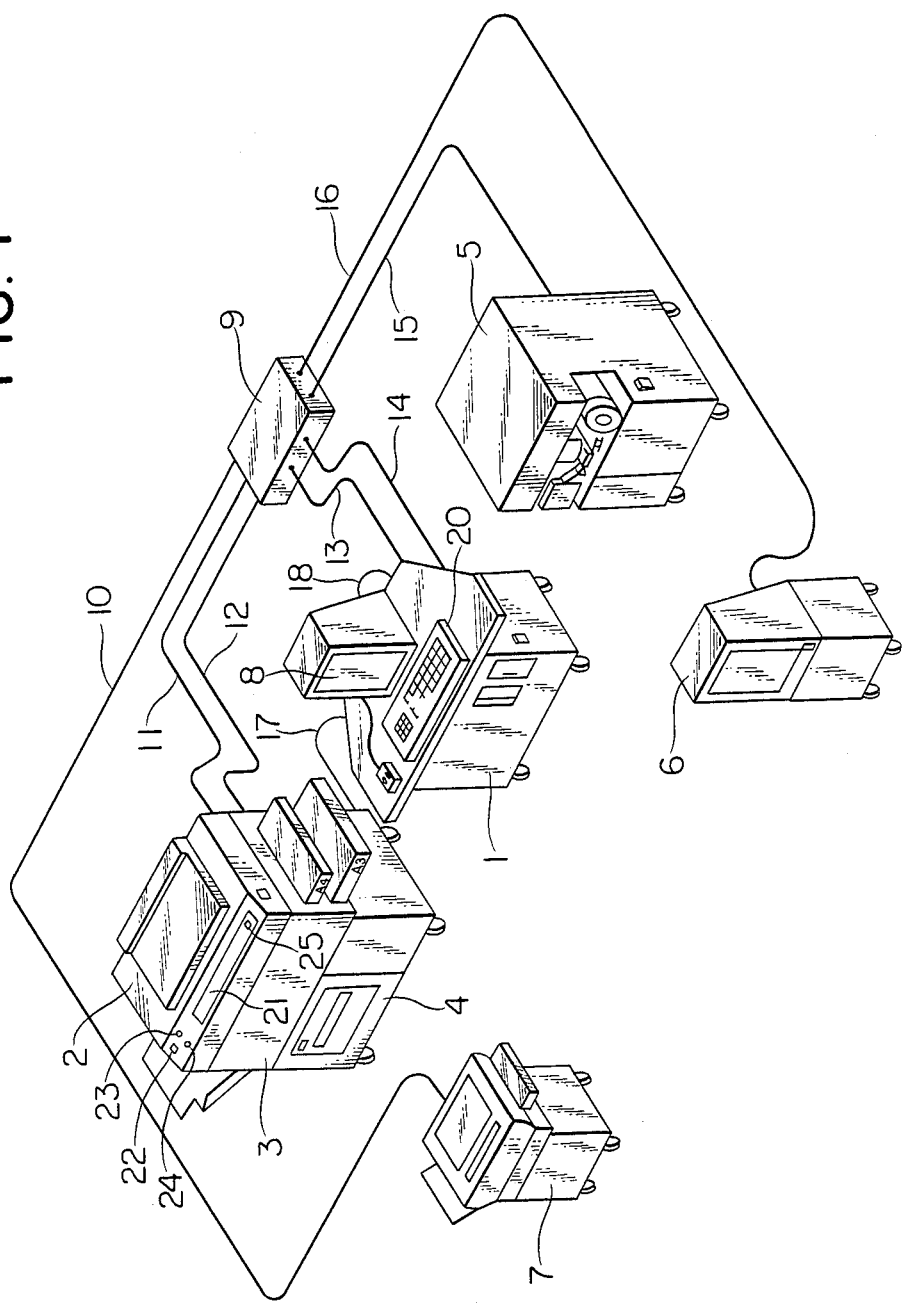
FIG. 1 is a perspective view showing connections of an image processing system to which the present invention can be applied.

FIG. 1 is a perspective view showing the connections of an image processing system to which the present invention is applied. A control section 1 (hereinafter referred to as work station 1) has a system control microcomputer, an internal memory such as a RAM or a ROM, and an external memory such as a floppy disc or a cartridge disc. The work station 1 generates a processing command of the system, and electrically processes an input image signal in accordance with a command entered by the operator. The work station 1 performs various processing such as move, shift or magnification change of an image, prepares a document with characters and symbols entered by an operator through a keyboard to be described later, or combines an image with a sentence or combines images. An original reader 2 as an input section of a digital copying machine reads with an image pickup device such as a CCD of about 5,000 bits document information from an original placed on an original table and converts the information into electrical signals. A high-speed printer 3 as an output section of the digital copying machine prints on a recording medium based on the electrical signals received and comprises, for example, a laser beam printer. An image file 4 has a recording medium such as a photo disc or an optomagnetic disc and allows write or readout of a large amount of image information. The image file 4 may store compressed image information. A microfilm file 5 has a microfilm retrieval section and a microfilm reader for converting image information on a microfilm retrieved by the retrieval section into electrical signals by an image pickup element such as a CCD of about 3,600 bits. A soft display 6 has a high resolution and is a photosensitive belt consisting of a transparent and electrically conductive belt-like base and a photoconductive film formed thereon. A laser beam modulated in accordance with an input image signal is irradiated onto the photoconductive layer through the base to form an electrostatic latent image corresponding to the density of image light in the photoconductive layer. The latent image is developed with a toner (developer) having a conductivity and magnetic property and held on a toner carrier. The soft display 6 thus forms a display image. A printer 7 is similar to the printer 3 but has a smaller size and a lower speed than those of the printer 3 and can be included as needed. A CRT device 8 displays image information photoelectrically read by a digital copying machine or an input scanner (reader) of the microfilm reader, and control information of the system. A switching device 9 switches connections between respective input and output devices in accordance with a signal from the work station 1. Cables 10 to 18 electrically connect the respective input and output devices. A keyboard 20 is arranged at the work station 1. An operation command and the like of the system can be entered by operating the keyboard 20. The keyboard 20 together with the CRT device 8 can serve as a wordprocessor or an office computer. A control panel 21 is used to input a control command for the digital copying machine. The control panel 21 has keys for setting the number of copies to be produced or the copying magnification, a copy start key 25 for instructing the copy start, and a numerical indicator. A mode switch 22 and LED indicators 23 and 24 for indicating the selection mode of the switch 22 are arranged next to the control panel 21. A wordprocessor, an office computer, or a facsimile other than the devices described above can be connected to the system.

Figure 2:
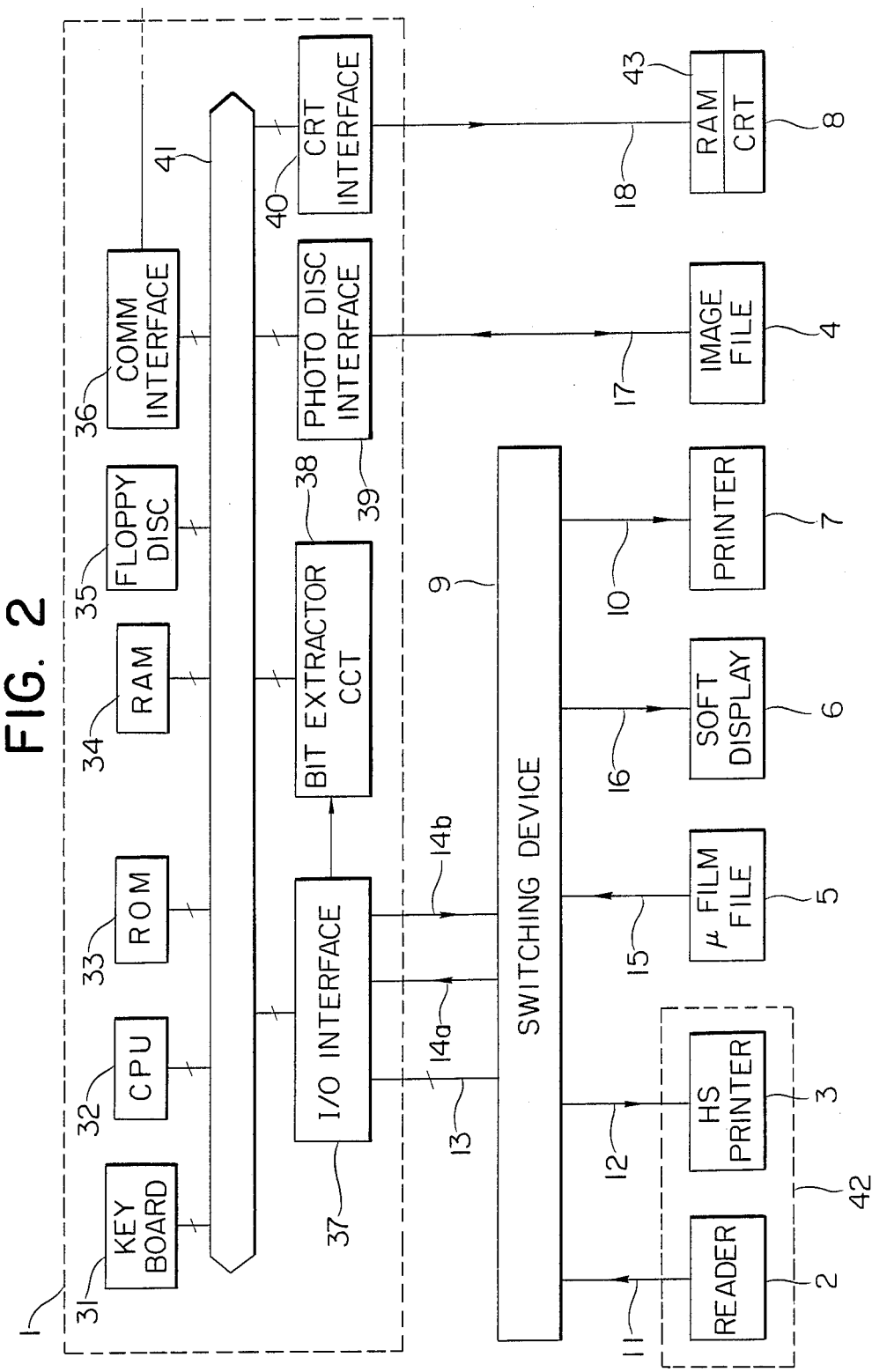
FIG. 2 is a block diagram showing the circuit configuration of the image processing system shown in FIG. 2.

FIG. 2 is a block diagram showing the circuit configuration of the image processing system shown in FIG. 1. Each block corresponding to one shown in FIG. 1 is designated by the same number in FIG. 2. Each block in the work station 1 will first be described. A keyboard 31 corresponds to the keyboard 20 shown in FIG. 1, and the operator inputs a control instruction of the system through this keyboard 31. A central processing unit (CPU) 32 comprises a microcomputer (e.g., 68000 of Motorola). A read-only memory (ROM) 33 stores a control program for the system. The CPU 32 performs a control operation in accordance with the program stored in the ROM 33. A random access memory (RAM) 34 is mainly used as a working memory of the CPU 32 or a page memory (main memory) for storing image signals which are exchanged between the respective input and output devices. An external memory 35 comprising a floppy disc stores a control program of the system or a data base for image retrieval from an image file to be described later. A communication interface 36 allows system expansion or information exchange with a similar system or a terminal device through a communication line such as a local area network or a digital facsimile communication line. An I/O interface 37 allows information exchange between the work station 1 and the switching device 9. A bit extractor circuit 38 deletes bits from the image signal at a predetermined rate. A photo disc interface 39 is for information exchange with the image file 4. A CRT interface 40 is for information exchange with the CRT device 8. A 16-bit bus 41 allows signal transfer between respective blocks in the work station 1. A known wordprocessor or an office computer can be connected to the bus 41. The cables 11 to 18 electrically connect the respective input-/output devices as described above and transmit control signals, image signals and clock pulses synchronized with the image signals. Arrows on the respective cables indicate the direction of image signal transfer. The control signals are transferred in both directions in each cable. As can be seen from FIG. 2, the cables 11, 12, 15, 16 and 10 connect the original reader 2 and the high-speed printer 3 of a digital copying machine 42, the microfilm file 5, the soft display 6, and the small printer 7 to the switching device 9. The switching device 9 is connected to the work station 1 through the I/O interface 37 and the cables 13 and 14. The image file 4 and the CRT device 8 are connected to the interfaces 39 and 40 of the work station 1 through the cables 17 and 18, respectively. A display RAM 43 stores image information to be displayed. An image signal inputted or outputted through the switching device 9 is a serial signal and information on the bus 41 of the work station 1 is a parallel signal. Therefore, the I/O interface 37 has a serial-to-parallel register for fetching or taking in an image signal and a parallel-to-serial register for outputting an image signal. The parallel image signal is DMA transferred on the bus 41.

An image signal outputted from the original reader 2 or the microfilm file 5 is supplied to the I/O interface 37 of the work station 1 through the switching device 9 in units of lines. The I/O interface 37 converts the input serial image signal supplied in synchronism with the clock pulses into 16-bit parallel image signals and produces these signals onto the bus 41. The image signals on the bus 41 are sequentially stored in an image area of the RAM 34 in units of pages. The image signals stored in the RAM 34 in this manner are produced onto the bus 41 again and are produced externally through the communication interface 36. The image signals are also supplied to the image file 4 through the photo disc interface 39 and written in the photo disc. Alternatively, the image signals are transferred to the switching device 9 through the I/O interface 37 and are selectively supplied to the high-speed printer 3, the soft display 6 or the small printer 7 for image formation.

Image signals read out from the photo disk of the image file 4 are written in the RAM 34. Thereafter, the image signals are selectively transferred to the high-speed printer 3, the soft display 6 or the small printer 7 through the I/O interface 37.

Image signals from the original reader 2 or the microfilm file 5 are selectively and directly transferred in a corresponding mode to the high-speed printer 3, the soft display 6 or the small printer 7 through the switching device 9 and without going through the work station 1. When only a copying operation is to be performed, the image file 4 or the CRT device 8 is not required. Therefore, the copy operation is performed without using the work station 1 and by, for example, directly supplying image signals from the original reader 2 to the high-speed printer 3 to allow a real time copying operation. This mode will be referred to as the bypath mode.

Control of transmission of image signals is performed by the CPU 32 in accordance with a control instruction inputted by the operator.

Figure 3:
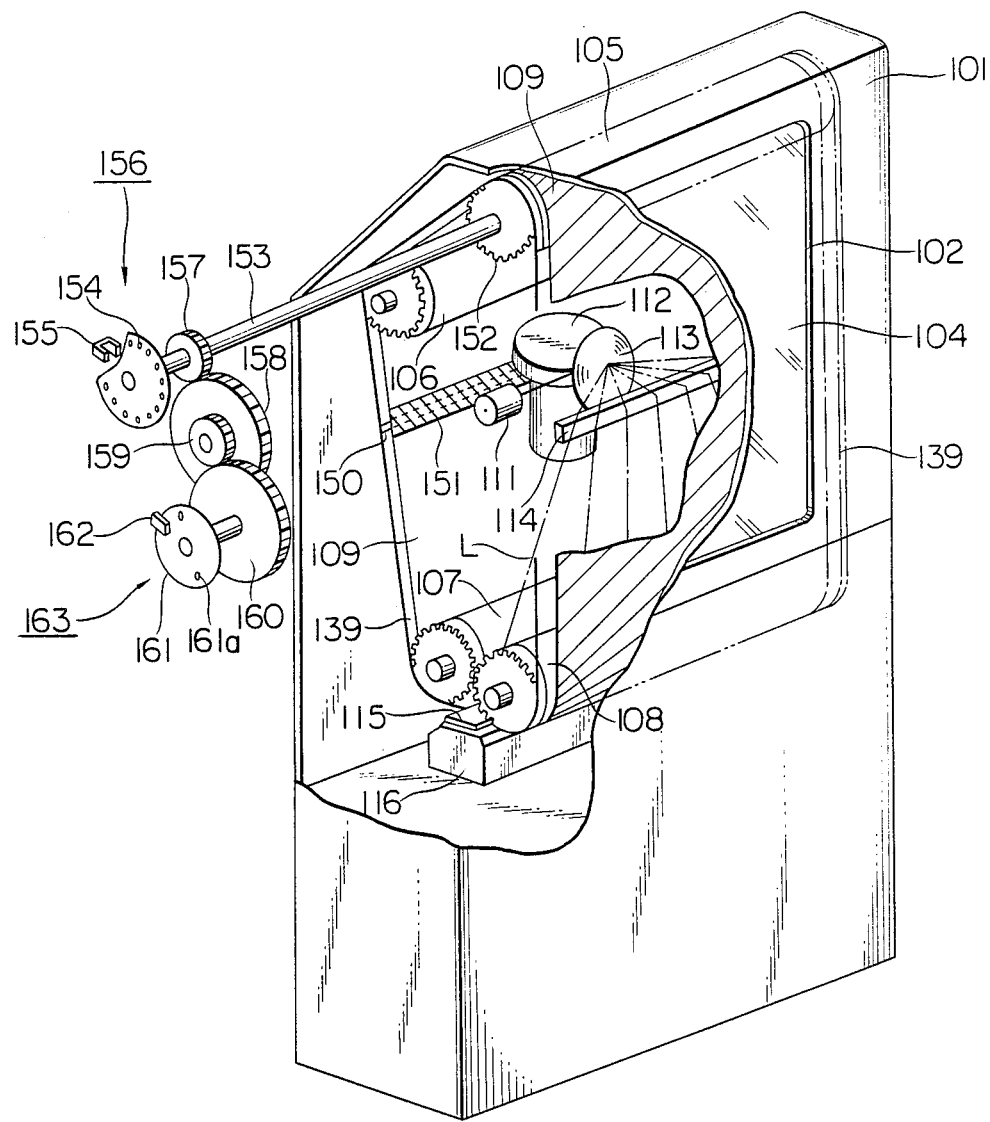
FIG. 3 is a view showing the construction of a soft display.

FIG. 3 shows the construction of the soft display 6.

A display observation window hole 102 is formed in the front panel of an outer casing 101 of the display 6. A display window glass 104 is fitted in the hole 102. An endless photosensitive belt 109 is looped around four support rollers 105, 106, 107 and 108. The rollers 105 and 106 are arranged at the upper side of the casing 101, while the rollers 107 and 108 are arranged at the lower side of the casing 101 such that they extend parallel to each other from the left to right side of the casing 101 and are each supported rotatably.

The endless photosensitive belt 109 has a base layer consisting of a transparent layer of polyester or the like and a photosensitive material layer (photoconductive layer) such as CdS formed on a thin conductive metal layer deposited on the outer side of the sheet. The belt 109 is flexible and is wound around the rollers such that the photosensitive layer faces outward.

Among the four rollers 105 to 108, the roller 105 is used as a drive motor to transmit the drive force of a motor M1 (not shown). At least one of the remaining three rollers 106 to 108, for example, the roller 106 serves as a belt tension roller to provide a predetermined tension on the belt 109. Thus, when the roller 105 is driven counterclockwise (FIG. 3) by the motor M1, the belt 109 is rotated counterclockwise without any loosening or slippage. Then, the outer side of the belt 109 between the rollers 105 and 106 is moved upward along the observation window hole 102.

A laser beam scanning type image exposure apparatus is arranged at a predetermined position inside the belt 109. The exposure apparatus has a semiconductor laser oscillator 111, a polygonal mirror scanner 112, an f·θ lens (imaging lens) 113, a reflecting mirror 114, and a transparent plate 115. The transparent plate 115 is an elongated, flat and transparent plate of glass or plastic which is urged at a predetermined pressure against the inner side portion of the belt 109 between the rollers 107 and 108.

In this exposure apparatus, a laser beam L corresponding to a time-serial electric pixel signal supplied through the switching device 9 is oscillated from the semiconductor laser oscillator 111 at the front side toward the rotating polygonal mirror scanner 112 at the rear side. The laser beam L which has become incident on the scanner 112 is deflected in the direction along the widthwise direction of the belt 109 and becomes incident on the inner side of the belt 109 between the rollers 107 and 108 through the f-θ lens 113, the reflecting mirror 114, and the transparent plate 115. Thus, image exposure is performed using the laser beam scanning as main scanning and rotation of the belt 109 as subscanning.

A toner developing unit 116 is arranged outside the belt portion between the rollers 107 and 108. The lower surface of the transparent plate 115 is at a lower level than that of a common lower tangent of the rollers 107 and 108, and is in contact with the inner side of the belt 109. The ends of the plate 115 are chamfered so as to allow smooth contact with the belt 109. The transparent plate 115 serves to prevent the vertical oscillation of the belt 109 which is caused by contact with a magnetic developing brush (not shown) of the developing unit 116, to keep the constant exposure position, and to improve resolution.

The belt 109 as a photosensitive body first starts to be rotated at a predetermined speed. Then, the laser beam scanning exposure of designated image information for the inner side portion of the belt 109 between the rollers 107 and 108 is started. Since the toner of the developing unit 116 starts to act on the belt 109 at the same time as the exposure operation, a toner image corresponding to the exposed image is sequentially formed on the outer side of the belt 109. When the toner image formed on the outer surface of the belt is moved upward to the designated window hole position in the hole 102 upon rotation of the belt 109, the rotation of the belt 109 is temporarily stopped. Then, an image display through the hole 102 is performed, and the image can be viewed through the display window glass 104. When the belt 109 is driven again in response to a belt rotation resume command, the next display image is moved to the window hole position to be displayed. The toner image on the outer side of the belt after display reaches the toner developing unit 116 to be cleaned with a developing brush. Then, the belt is exposed to the next information to form a new image thereon.

In this manner, since the image information is displayed as a toner image and exposure is performed with a very fine laser beam L, a high-resolution image display of a fine character or the like can be performed. In such an apparatus, since the exposure and toner application are performed simultaneously, an image display on a relatively large display surface can be obtained with a simple construction and without requiring a corona charger or a special cleaning means. Similarly, a high-reliability display apparatus which is less subjected to failure or degradation in the photosensitive body can be obtained.

In the soft display 6 as described above, a problem is encountered when the size of the display surface is different from that of the display image. Assume that a display image of vertical A4 size is inputted for a display surface of vertical A3 size. Then, when the image of vertical A4 size is displayed on the display surface of vertical A3 size, the image is displayed at the upper left position on the display surface. In this manner, if the size of a display surface is different from that of the display image, the display position is deviated from the normal position, so that observation of the image becomes difficult for the operator.

In view of this, the present invention provides an image display apparatus which can display a display image always at the center of the display surface even if a display image has a size different from that of the display surface. In an image display apparatus for forming an image on an image carrier and for displaying an image, control is performed such that the center of the display image is aligned with that of the image carrier display surface.

Referring to FIG. 3, a plate stay 150 connects the belt 108 with two chains 139 and is located at a joint 151 or the like of the belt 109. Rotation of the roller 105 is transmitted through this plate stay 150 from the chains 139 meshing with sprockets 152 mounted at the two ends of the roller 105 to the photosensitive belt 109. Thus, the belt 109 is driven. The tooth position of the sprockets 152, the position of the belt 109, and the page display position on the belt 109 are kept to be the same.

An extension shaft 153 extends from the rotating shaft of the roller 105. A disc 154 has holes or teeth and is fixed to the shaft end of the shaft 153. A photointerruptor 155 allows passage of the holes or teeth of the disc 154. The disc 154 and the photointerruptor 155 together constitute a photoencoder 156 to be used as a signal generating detecting means (belt clock sensor) for obtaining an operation timing for each page. A train of gears 157 to 160 are driven by the extension shaft 153. A disc 161 is fixed to the shaft end of the output side gear 160. The disc 161 and a photointerruptor 162 constitute a photoencoder 163 to be used as a home position detecting means (home position sensor) for each page.

Figure 4A:
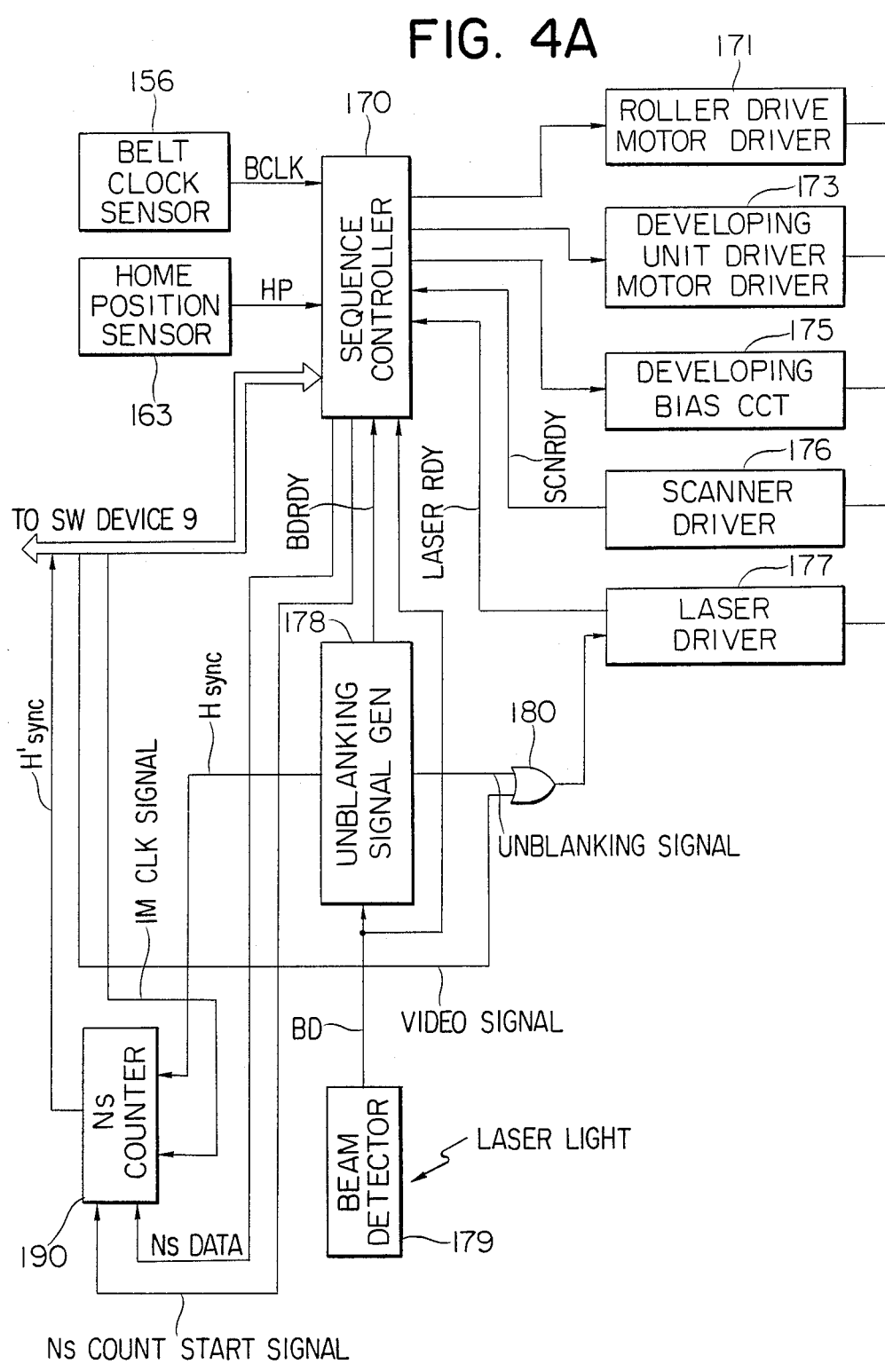
FIG. 4 composed of FIGS. 4A and 4B is a block diagram of a control circuit of a soft display.
Figure 4B:
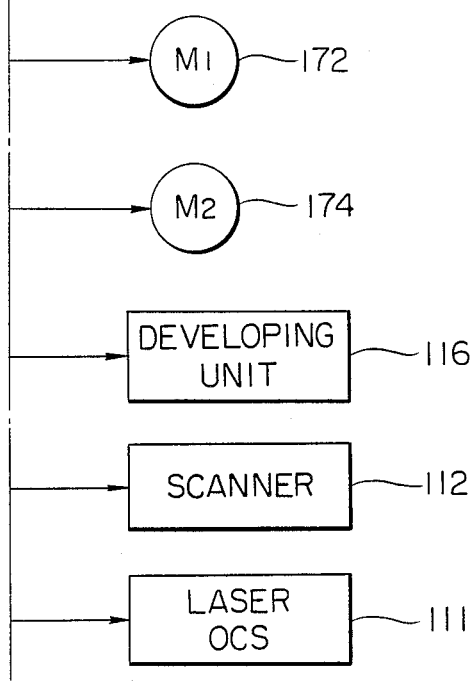
Figure 4:
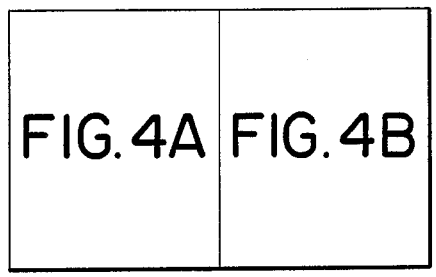

FIG. 4 shows a control circuit of the soft display 6 shown in FIG. 3. A sequence controller 170 manages and controls a predetermined operation such as a start designation of the display operation or a display page number designation. A roller drive motor driver 171 drives a roller drive motor (M1) 172 for driving the belt 109. A developing drive motor driver 173 drives a developing motor 174 for driving a developing sleeve (developing brush). A developing bias circuit 175 applies a developing bias voltage of +200 V to +300 V to the developing unit 116. The ON/OFF operation of the drivers 171 and 173 and the circuit 175 is controlled in accordance with control signals from the sequence controller 170.

An output signal BCLK from the belt clock sensor (photoencoder) 156 directly mounted at the shaft 153 of the support roller 105 and an output signal HP from the hole position sensor (photoencoder) 163 mounted through the train of the gears 157 to 160 to the shaft 153 of the drive roller 105 are supplied to the sequence controller 170 as position detection signals of the belt 109. In response to the signals BCLK and HP, the sequence controller 170 discriminates the drive timing of the drivers 171 and 173 and the circuit 175 and performs proper sequence control. In this case, the output signal HP indicates a reference position, e.g., a leading end position of the display page portion of the belt 109. Thus, when the disc 161 of the sensor 163 is rotated and image information of two pages can be written upon each rotation of the belt 109, two holes 161a are formed at two positions of the disc 161 (FIG. 3) at equal intervals, such that two signals HP are generated upon each rotation of the disc 161.

A scanner driver 176 drives the scanner 112 which scans the laser beam from the laser oscillator 111 in the main scanning direction. The scanner driver 176 supplies to the sequence controller 170 a signal SCNRDY representing whether or not the scanner 112 is rotating at a predetermined speed. A laser driver 177 drives the laser oscillator 111. The laser driver 177 supplies to the sequence controller 170 a signal Laser RDY representing whether or not the laser oscillator 111 is abnormal, i.e., a temperature control abnormality is present.

An unblanking signal generator 178 generates an unblanking signal used for emitting laser light in a non-image region of the main scanning direction. A beam detector 179 detects the laser light and supplies a laser light detection signal BD to the unblanking signal generator 178. In response to the laser light detection signal BD, the unblanking signal generator 178 generates a sync signal Hsync which is used to synchronize in the main scanning direction the video signal supplied from external equipment (not shown) of an image reader or an external memory. The unblanking signal is supplied to the laser driver 177 through an OR gate 180 together with the video signal. In response to the detection signal BD, the unblanking signal generator 178 also performs an asynchronous detection of the main scanning and supplies a corresponding detection signal BDRDY to the sequence controller 170.

The sequence controller 170 also receives an interface signal with communication connection with external equipment so as to perform exchange of data or commands with the external equipment.

An Ns counter 190 has a function to be described with reference to FIG. 5.

Figure 5:
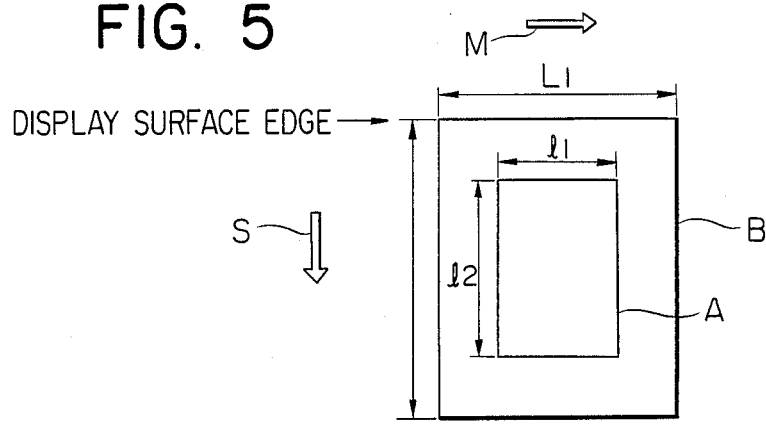
FIG. 5 is a representation showing the relationship between a display surface and a display image.

FIG. 5 shows only a display surface according to the embodiment of the present invention. The portion shown in FIG. 5 includes a display surface B having a size of L1×L2 of the belt 109 and a display image A having a size of l1×l2.

Referring to FIG. 5, an image is formed such that the laser beam is scanned from the left to the right side (this will be referred to as main scanning and will be designated by arrow M) and the belt is moved upward (the image is formed from the upper side toward the lower side; this will be referred to as subscanning and will be designated by arrow S). In order to keep the image A at the center of the display surface B, the writing in start timing of the image must be set properly in both of the main and subscanning directions.

The image writing in start timing in the subscanning direction S is determined in the following manner.

The display surface and image shown in FIG. 5 have lengths of L2 and l2. Thus, the image can be written from a position at a distance (L2−l2)/2 from the edge of the display surface. According to this embodiment, the number of scanning lines in the main scanning direction is counted so as to determine the value of (L2−l2)/2 in this embodiment. When main scanning of lines Pm per mm is performed, the main scanning line number from the edge of the display surface to the writing in start position of the image is given by:

$$Np = \{(L2-l2)/2\} \times Pm$$

(fractions are rounded). More specifically, after a signal HP (FIG. 4) representing the edge of the display surface is detected, the laser light detection signal BD in the main scanning direction M is counted. When the count or counting number of the signals BD becomes Np, the writing in start position of the image is determined.

The writing in start timing of the image in the main scanning direction M is determined in the following manner.

The operation for determining the writing in start position of the image in the main scanning direction M is started when the writing in start position in the subscanning direction is determined. That is, in order to determine the writing in start timing of the image in the main scanning direction M, image clocks (FIG. 4) synchronous with the image data is counted. Counting of the image clocks is performed in synchronism with the signal BD representing the start of main scanning.

The counting number of the image clocks is given by:

$$Ns = \{(L1-l1)/2\} \times Ps$$

(fractions are rounded)
where L1 and l1 are widths of the display surface and the display image along the main scanning direction M, and Ps is the number of pixels in the main scanning direction. Therefore, when the counting number reaches Ns, the writing in start position of the image display can be determined. In accordance with the timing determined in this manner, an instruction is supplied to external equipment so as to cause the external equipment to produce image data of one main scanning operation. This operation is repeatedly performed until transmission of required image is completed. Then, the image A is formed at the center of the display surface B. In order to determine the delay time in the subscanning direction S in FIG. 4, the signals BD are counted by the sequence controller 170. In response to an Ns counting start signal from the sequence controller 170, the Ns counter 190 (a counter for determining the delay time in the main scanning direction M) starts counting. Data representing the counting "Ns" is preset by Ns data from the sequence controller 170. When a predetermined number of signals have been counted, a signal Hsync' requesting transmission of image data of one main scanning operation is supplied to the external equipment.

Figure 6:
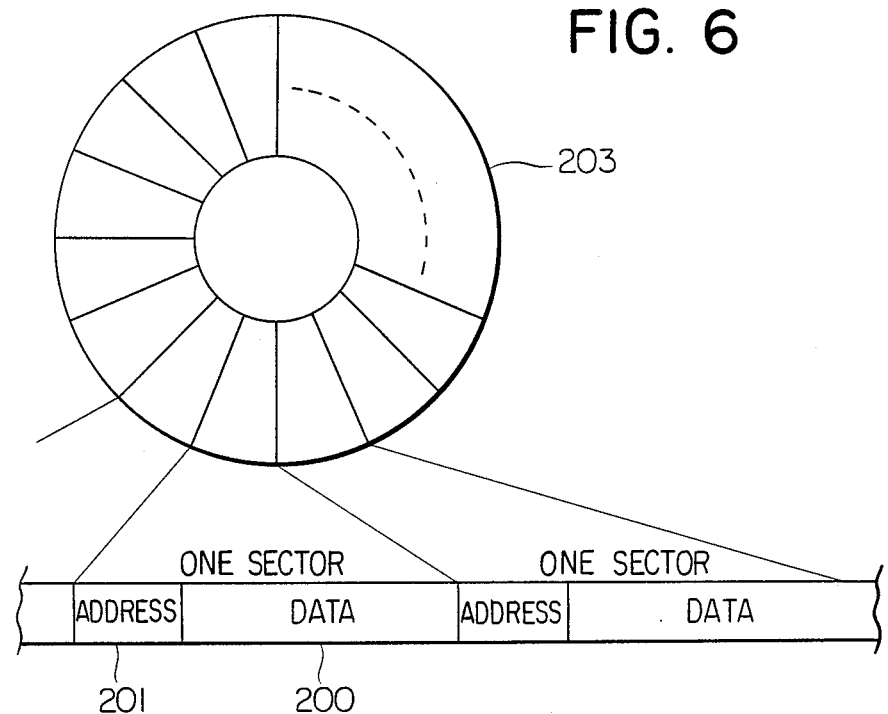
FIG. 6 is a representation showing a recording format of an image signal on a photo disc or an optical disc.

FIG. 6 shows a recording format when an image signal is recorded on the photo disc of the image file 4. As shown in FIG. 6, an image signal 200 to be recorded is recorded at an address portion 201 in each sector of a photo disc 203. The address portion 201 stores address information such as a track number or a sector number. The address information is also recorded on the floppy disc 35 of the work station 1 and is used as retrieval data for retrieving the image signal from the photo disc 203.

When an image is photoelectrically read by the original reader 2 or the microfilm file 5 and an image signal obtained by image reading is recorded in the image file 4, the image size is recorded together with the image signal on the photo disc 203. The original reader 2 has an original size detection mechanism or an original size designation mechanism. When an original is read, the original size information is formed automatically or manually. This information as image size information G (l1 and l2) is recorded in the address portion 201 together with the address information. When an image is read at the microfilm file 5, the image size information G of an output image signal is produced as in the case of the original reader 2 and is recorded in the photo disc 203 together with the image signal. Note that image size information and retrieval data can be prestored in the floppy disc 35 for storing the retrieval data for the microfilm file 5. Then, when data retrieval from the microfilm is performed, the image size information G can be read from the floppy disc 35 and can be recorded on the photo disc 35.

Figure 7:
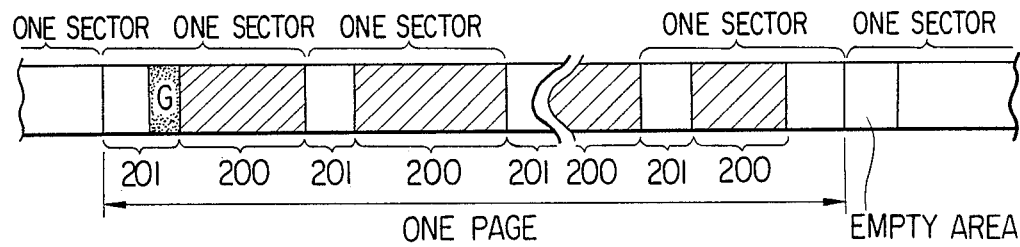
FIG. 7 is a representation showing another example of a recording format.

FIG. 7 shows another recording format when one image signal is recorded in a plurality of sectors of the photo disc 203 of the image file. In this case, the image size information G is recorded in the address portion 200 of the first sector storing the one-page image.

Figure 8:
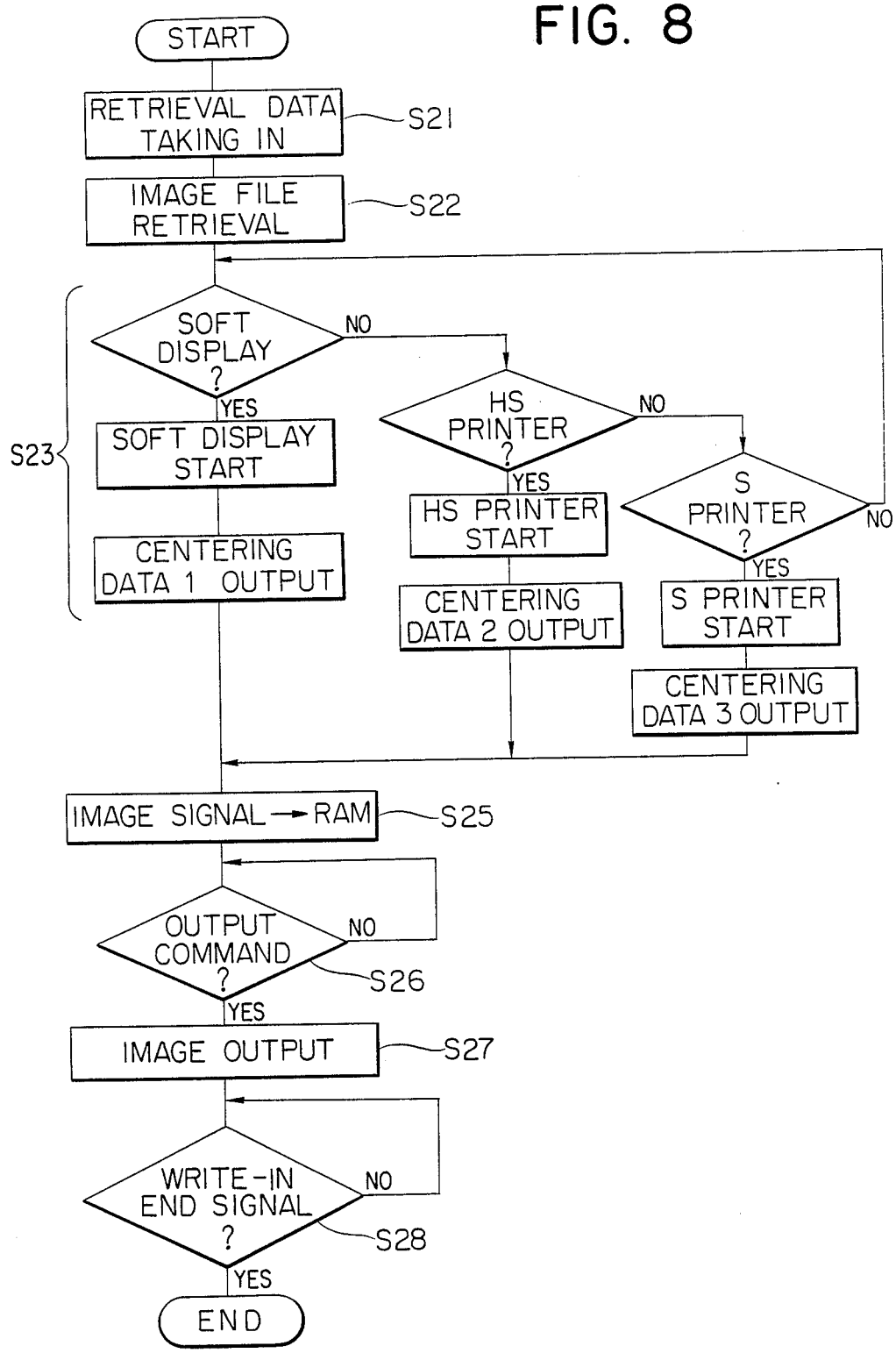
FIG. 8 is a flow chart showing the operation of a control section 1.

An operation will be described with reference to the flow chart shown in FIG. 8 wherein the image size information G is recorded in the photo disc 203 together with the image signal, and the image signal read out from the photo disc 203 is displayed with the soft display 6 or printed with the high-speed printer 3 or the small printer 7. First, the work station 1 accesses the image file 4 in accordance with the retrieval data from the keyboard 301 (steps S21, S22). The selected output device is started, and the image size information l1 and l2 corresponding to a retrieved image signal from the photo disc is transmitted to the selected one of the soft display 6, the high-speed printer 3 and the small printer 7 as centering data 1, 2 and 3, prior to the output of the image signal (steps S23, S24). The retrieved image signal is developed from the image file 4 to the RAM 34 (step S25), and an output command from the selected one of the soft display 6, the high-speed printer 3 and the small printer 7 is awaited (step S26). When an output command is received, the image signal is sequentially produced from the RAM 34 (step S27). When a write-in end signal is received (step S28), output of the image signal is stopped. The program of the flow chart shown in FIG. 8 is stored in the ROM 33 of the work station 1 and is read out and executed by the CPU 32.

An example of image display at the soft display 6 using the centering data 1 from the work station 1 will be described below.

Figure 9A:
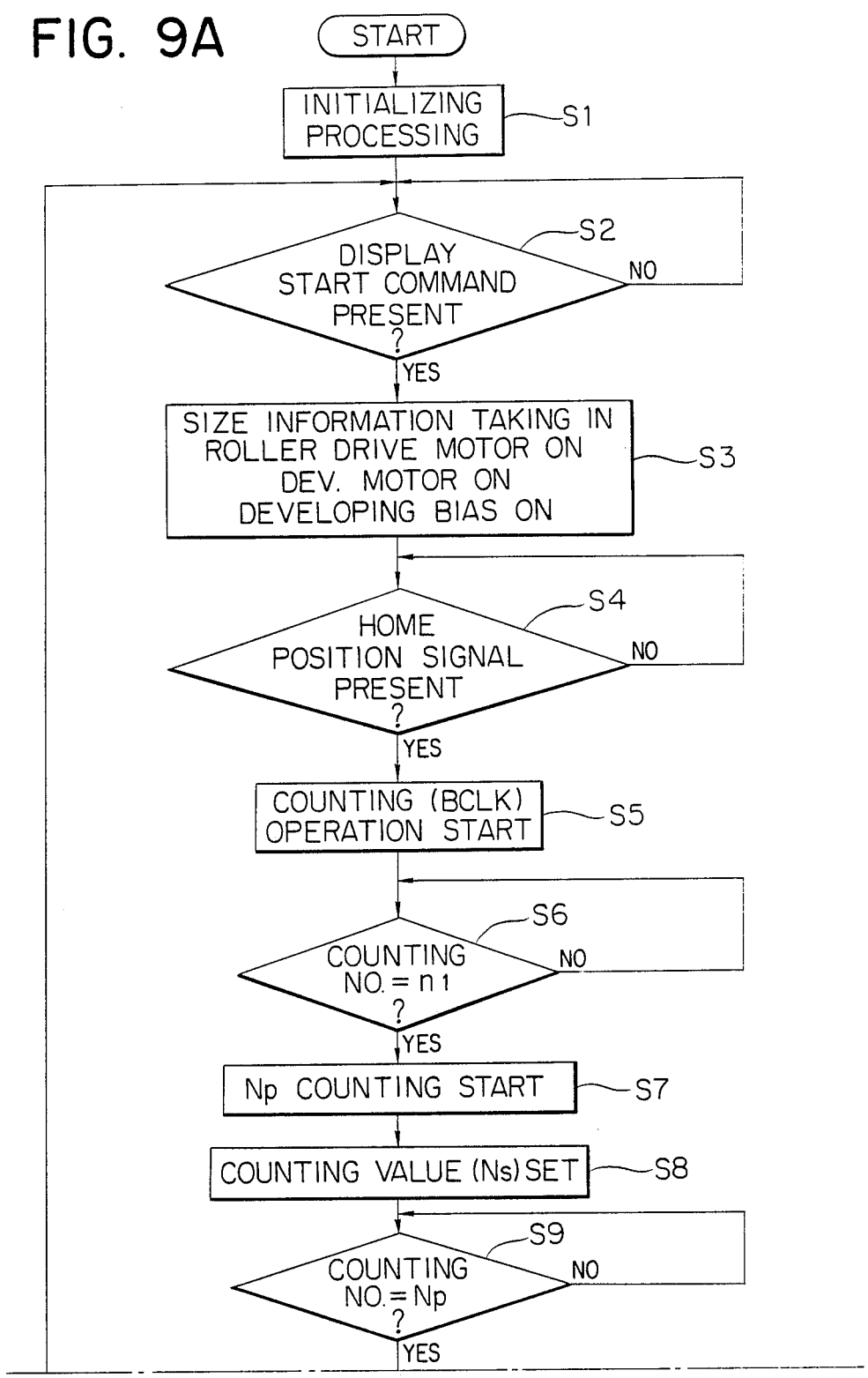
FIG. 9 composed of FIGS. 9A and 9B is a flow chart of a control operation of the soft display.

The control sequence of the sequence controller 170 of the soft display 6 shown in FIG. 4 will be described with reference to the flow chart shown in FIG. 9.

After power ON, in step S1, setting of the motors 172 and 174 and the unit 116 and initialization such as abnormality diagnosis or the like are performed.

Thereafter in step S2, an interface signal from the work station 1 is monitored to discriminate the presence or absence of a display start signal.

When it is determined that the display start command has been received, the flow goes to step S3. In step S3, the image size information l1 and l2 is taken in, the motor 172 is driven to rotate the belt 109, the motor 174 is driven, and a developing bias voltage is applied to the developing unit 116 to allow image writing in on the belt 109.

Subsequently, in step S4, supply of the home position signal HP from the home position sensor 163 generated in correspondence with the rotating position of the belt 109 is monitored. When the signal HP is detected, the flow advances to step S5. In step S5, the belt clock signals BCLK supplied from the belt clock sensor 156 are counted.

Since the signal HP represents the reference position of the display page portion, a position corresponding to a counting number n1 of the signals BCLK counted from the time of reception of the signal HP is an image writing in start position. In step S6, it is checked if the counting number of the signals BCLK has reached the predetermined counting number n1. If YES is step S6, in step S7, counting of Np in accordance with the equation above is started in accordance with the image size information l1 and l2 taken in step S3. In step S8, the counting number of the Ns counter is set.

In step S9, it is checked if the counting number has reached Np. When YES in step S9, a counting start command of the Ns counter is generated in step S10.

Thereafter, in step S11, a transmission command signal for instructing transmission of the video signal is supplied to the work station 1.

When the transmission command signal is supplied, in step S12, the video signal synchronous with the sync signal Hsync is supplied from the work station 1 through the switching device 9. Then, the laser driver 177 and the laser oscillator 111 are driven by the video signal, and the image writing in on the belt 109 is started.

During this image writing in, counting of the signals BCLK is continued. In step S13, it is checked if the counting number of the signals BCLK has reached a predetermined value n2.

When the counting number of the signals BCLK has reached the predetermined value n2, it is determined that the image writing in in the page portion has been completed. Then, the flow advances to step S14. In step S14, the motors 172 and 174 are stopped and the developing bias voltage is stopped. In step S15, a write-in end signal representing an end of the writing in operation of the image on the designated page portion in supplied to the work station 1.

In this state, the image written in the belt 109 is displayed at the window hole 102. After the display operation is ended, the flow returns to step S2. The above processing is repeated in accordance with a display start command.

In the above description, image information read out from the photo disc is displayed at the soft display 6. However, an image can be printed at the center of a recording medium such as a paper sheet with the high-speed printer 3 or the small printer 7. In this case, unlike the case of the soft display 6, L1 is replaced with the length of the recording medium and L2 is replaced with the width thereof. In accordance with these values, the image formation position on the photosensitive body of the printer is shifted from the reference position so as to form the image at the center of the recording medium. Therefore, in step S23 in FIG. 8, centering data is supplied in accordance with each of the output devices (i.e., the soft display 6, the high-speed printer 3 and the small printer 7). An image signal from the original reader 2 or the microfilm file 5 can be supplied to the soft display 6, the high-speed printer 3 or the small printer 7 without going through the work station 1 in the bypath mode.

In summary, according to the present invention, a display image can be always displayed or formed at the center of the display surface or the recording medium surface, so that image observation is easy.

What is claimed is:

1. An image processing system comprising:
   storage means for storing image signals, each representing a respective image, and a size information signal whose value is varied in response to the size of each of the images;

reading means for selectively reading a desired one of the image signals and its corresponding size information signal;

an image bearing member which is movable and is formed in a shape of a belt;

image forming means for forming a visible image on said image bearing member in response to said image signal read out by said reading means;

a display station for displaying the visible image formed on said image bearing member;

count means for counting a movement time of said image bearing member; and control means for controlling said image forming means in accordance with the size information signal read out from said storage means, the size of a display area of said display station and a count value of said count means such that the visible image is displayed at the center of the display area of said display station.

2. A system according to claim 1, wherein said storing means includes an optical disc.

3. A system according to claim 1, wherein said image bearing member comprises a photosensitive material.

4. A system according to claim 1, wherein said control means includes calculating means for calculating, in accordance with the size information, the position at which the image is to be displayed.

5. A system according to claim 1, wherein said count means. the count value in response to the size information signal.

6. A system according to claim 5, wherein said control means changes, in accordance with the count value, the initial position from which the image is to be formed on said image bearing member.

7. A system according to claim 1, wherein said count means counts a number of scanning line in a direction in which said image bearing member moves.

8. A system according to claim 1, wherein said control means controls said image forming means such that the visible image is displayed at the center of said display area, in a direction along a width of said display area.

9. A system according to claim 8, wherein said control means controls a starting timing of a single line of image formation 10. A system according to claim 1, wherein said image bearing member has a housing, and wherein said display station is a window arranged at said housing of said image bearing member.

11. A system according to claim 8, further comprising a second counting means for counting clock signals synchronized with the image signal, wherein said second counting means changes the value of the counted clock signals in accordance with the size information.

12. A system according to claim 8, further comprising a second counting means for counting clock signals synchronized with the image signal, wherein said second counting means changes the value of the counted clock signals in accordance with the size information signal.

13. A system according to claim 1, wherein said control means controls image forming timing in a direction in which said image bearing member moves.

14. An image processing system comprising:

reading means for photoelectrically reading an original image to generate an image signal;

size signal generating means for generating a size signal whose value is varied in response to the size of the original image read by said reading means;

an image bearing member which is movable and is formed in a shape of a belt;

image forming means for forming a visible image on said image bearing member, in response to the image signal generated by said reading means;

a display station for displaying the visible image formed on said image bearing member;

count means for counting a movement time of said image bearing member; and control means for controlling said image forming means in accordance with the size signal, the size of a display area of said display station and a count value of said count means such that the visible image is displayed at the center of the display area of said display station.

15. A system according to claim 14, further comprising storing means for storing the image signal from said reading means and for supplying the image signal to said image forming means.

16. A system according to claim 14, wherein said control means includes calculating means for calculating, in accordance with the size signal, the position at which the image is to be displayed.

17. A system according to claim 14, wherein said count means. varies the count value in response to the size signal.

18. A system according to claim 17, wherein said control means changes, in accordance with the count value, the initial position from which the image is to be formed on said image bearing member.

19. A system according to claim 14, wherein the visible image displayed on said image bearing member is erasable.

20. A system according to claim 14, wherein said count means counts a number of scanning lines in a direction in which said image bearing member moves.

21. A system according to claim 14, wherein said control means controls said image forming means such that the visible image is displayed at the center of said display area, in a direction along a width of said display area.

22. A system according to claim 21, wherein said control means controls a starting timing of a single line for image formation.

23. A system according to claim 14, wherein said image bearing member has a housing, and wherein said display station is a window arranged at said housing.

24. A system according to claim 5, wherein said control means controls image forming timing in a direction in which said image bearing members moves.

* * * * *

UNITED STATES PATENT AND TRADEMARK OFFICE
CERTIFICATE OF CORRECTION

PATENT NO. : 4,769,852  Page 1 of 2
DATED : September 6, 1988
INVENTOR(S) : NORIO HASHIMOTO, ET AL.

It is certified that error appears in the above-identified patent and that said Letters Patent is hereby corrected as shown below:

COLUMN 1

Line 55, "2;" should read --1;--.

COLUMN 5

Line 63, "subjected" should read --subject--.

COLUMN 7

Line 13, "Laser" should read --LASER--.
　　Line 48, "ginated" should read --ignated--.

COLUMN 9

Line 10, "photo disc 35." should read --photo disc 203.--.
　　Line 24, "keyboard 301" should read --keyboard--.

COLUMN 10

Line 34, "in" should read --is--.

COLUMN 11

Line 32, "means." should read --means varies--.
　　Line 39, "line" should read --lines--.
　　Line 54, "claim 8," should read --claim 1,--.

UNITED STATES PATENT AND TRADEMARK OFFICE
CERTIFICATE OF CORRECTION

PATENT NO. : 4,769,852

DATED : September 6, 1988

INVENTOR(S) : NORIO HASHIMOTO, ET AL.

It is certified that error appears in the above-identified patent and that said Letters Patent is hereby corrected as shown below:

COLUMN 12

Line 36, "means." should read --means--.
Line 59, "claim 5," should read --claim 14,--.

Signed and Sealed this

Eighteenth Day of April, 1989

Attest:

DONALD J. QUIGG

Attesting Officer

Commissioner of Patents and Trademarks